US010025239B2

(12) United States Patent
Kato

(10) Patent No.: US 10,025,239 B2
(45) Date of Patent: Jul. 17, 2018

(54) IMAGE FORMING APPARATUS DETERMINING ORDER FOR STARTING FIRST MOTOR AND SECOND MOTOR BY USING TEMPERATURE OF FIXING DEVICE

(71) Applicant: BROTHER KOGYO KABUSHIKI KAISHA, Nagoya, Aichi (JP)

(72) Inventor: Sadaharu Kato, Anjo (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 15/468,725

(22) Filed: Mar. 24, 2017

(65) Prior Publication Data

US 2017/0285536 A1    Oct. 5, 2017

(30) Foreign Application Priority Data

Mar. 30, 2016  (JP) .................................. 2016-068609

(51) Int. Cl.
*G03G 15/00* (2006.01)
*H04N 1/00* (2006.01)
*G06K 15/00* (2006.01)
(Continued)

(52) U.S. Cl.
CPC ..... *G03G 15/205* (2013.01); *G03G 15/04072* (2013.01); *G03G 15/2039* (2013.01);
(Continued)

(58) Field of Classification Search
CPC .......... G03G 15/04072; G03G 15/205; G03G 15/2039; G03G 15/5004; G03G 15/5008;
(Continued)

(56) References Cited

U.S. PATENT DOCUMENTS 5,164,570 A * 11/1992 Okimura ............ G03G 15/2003
219/216
5,850,245 A * 12/1998 Goto ...................... G06K 15/12
347/156
(Continued)

FOREIGN PATENT DOCUMENTS

JP     H02-216166 A      8/1990
JP     H07-334039 A     12/1995
(Continued)

*Primary Examiner* — Robert Beatty
(74) *Attorney, Agent, or Firm* — Scully, Scott, Murphy & Presser, PC

(57) ABSTRACT

In an image forming apparatus a controller starts a heater to heat up in response to a print command In a first case where temperature of the fixing device at a timing of reception of the print command is lower than a first threshold value, the controller starts rotating a first motor, and subsequently starts rotating a second motor before the conveying device conveys the sheet according to the received print command. The first threshold value is lower than the target temperature. In a second case where the temperature of the fixing device at the timing of reception of the print command is higher the first threshold value, the controller starts rotating the second motor, and subsequently starts rotating the first motor before the conveying device conveys the sheet according to the received print command.

19 Claims, 8 Drawing Sheets

(51) Int. Cl.
  *G03G 15/20* (2006.01)
  *G03G 15/04* (2006.01)
  *H04N 1/113* (2006.01)

(52) U.S. Cl.
  CPC ....... *G03G 15/5004* (2013.01); *G06K 15/406* (2013.01); *H04N 1/00904* (2013.01); *H04N 1/113* (2013.01)

(58) Field of Classification Search
  CPC ....... G03G 2215/0404; H04N 1/00904; H04N 1/113; G06K 15/4055; G06K 15/406
  USPC ............. 399/69, 88, 167; 347/243, 259, 261
  See application file for complete search history.

(56) References Cited

U.S. PATENT DOCUMENTS

| | | | |
|---|---|---|---|
| 2003/0035659 A1* | 2/2003 | Uchiyama | G03G 15/2003 399/69 |
| 2004/0264986 A1* | 12/2004 | Sasai | G03G 15/50 399/44 |
| 2005/0280378 A1 | 12/2005 | Suzuki | |
| 2007/0216758 A1* | 9/2007 | Matsuura | H04N 1/00885 347/261 |
| 2013/0202323 A1 | 8/2013 | Takeuchi et al. | |
| 2017/0060060 A1* | 3/2017 | Suzuki | G03G 15/235 |

FOREIGN PATENT DOCUMENTS

| | | | |
|---|---|---|---|
| JP | 09244509 A | * | 9/1997 |
| JP | 11015332 A | * | 1/1999 |
| JP | 11344913 A | * | 12/1999 |
| JP | 2004-138840 A | | 5/2004 |
| JP | 2006-003755 A | | 1/2006 |
| JP | 2008026792 A | * | 2/2008 |
| JP | 2013-160920 A | | 8/2013 |
| JP | 2015069039 A | * | 4/2015 |
| KR | 2003044261 A | * | 6/2003 |

* cited by examiner

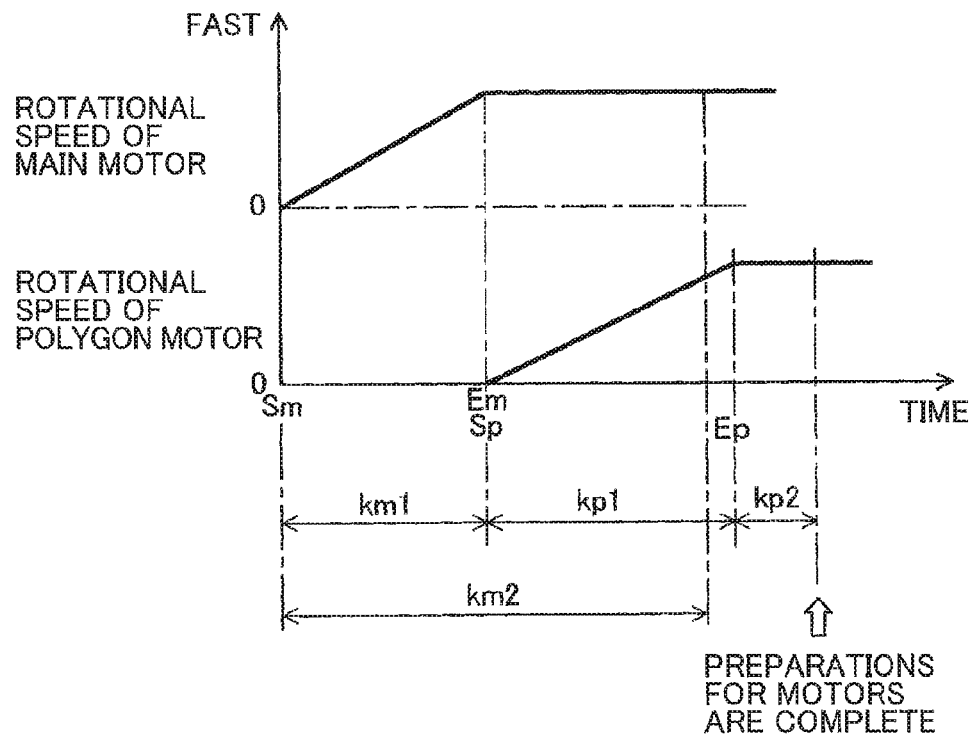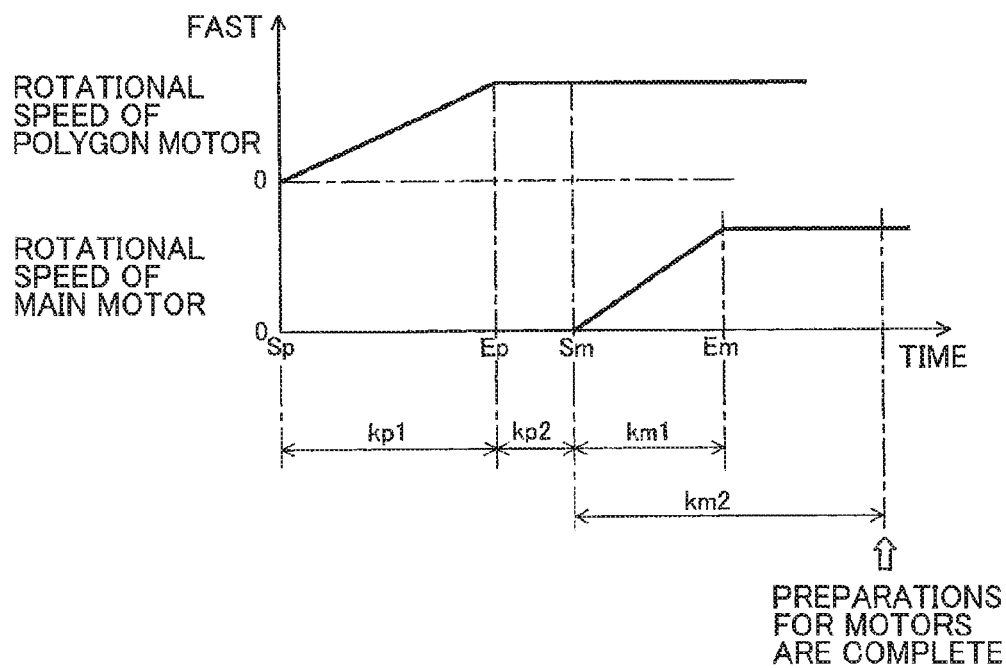

ured to output a signal depending on temperature of the fixing device. The controller is operatively connected to the first motor, the second motor, the heater, and the conveyance device. The controller is configured to: start the heater to heat up in response to a print command; in a first case where the signal indicates that the temperature of the fixing device at a timing of reception of the print command is lower than a first threshold value, start rotating the first motor before the temperature of the fixing device reaches a target temperature, and subsequently start rotating the second motor before the conveying device conveys the sheet according to the received print command wherein the first threshold value is lower than the target temperature; and in a second case where the signal indicates that the temperature of the fixing device at the timing of reception of the print command is higher the first threshold value, start rotating the second motor before the temperature of the fixing device reaches the target temperature, and subsequently start rotating the first motor before the conveying device conveys the sheet according to the received print command.

According to another aspects, the disclosure provides an image forming apparatus. The image forming apparatus includes a polygon mirror, a first motor, a photosensitive member, a fixing device, a second motor, a sensor, and a controller. The polygon mirror is configured to reflect light emitted from a light source. The first motor is configured to rotary drive the polygon mirror. The photosensitive member has an outer peripheral surface to which the light reflected by the polygon mirror emits. The fixing device has a heater, a first member, and a second member. The first member and the second member are configured to convey a sheet interposed therebetween. The fixing device is located downstream of the photosensitive member in a conveying direction of the sheet. The second motor is configured to rotary drive the first member. The sensor is configured to output a signal depending on temperature of the fixing device. The controller is operatively connected to the first motor, the second motor, and the heater. The controller is configured to: start the heater to heat up in response to a print command; estimate a first time period starting at a timing when the heater starts heating up and ending at an estimated timing when the second motor starts rotation; in a first case where the first time period is longer than a second time period, set a first-motor-start timing prior to a second-motor-start timing, wherein the first-motor-start timing is a timing at which the first motor starts rotation and the second-motor-start timing is a timing at which the second motor starts rotation, the second time period including an estimated preparation time period for the first motor from a rotation start timing of the first motor to a timing at which rotation of the first motor reaches a first target rotational speed, and in a second case where the first time period is shorter than the second time period, set the second-motor-start timing prior to the first-motor-start timing.

IMAGE FORMING APPARATUS DETERMINING ORDER FOR STARTING FIRST MOTOR AND SECOND MOTOR BY USING TEMPERATURE OF FIXING DEVICE

CROSS REFERENCE TO RELATED APPLICATION

This application claims priority from Japanese Patent Application No. 2016-068609 filed Mar. 30, 2016. The entire content of the priority application is incorporated herein by reference.

TECHNICAL FIELD

The present disclosure relates to an image forming apparatus that forms images with an electrophotographic system and a method and program for controlling the image forming apparatus, and particularly to a method for controlling a plurality of motors provided in the image forming apparatus.

BACKGROUND

One configuration known in the art of an image forming apparatus that forms images with an electrophotographic system includes a main motor as the drive source for a pair of rotary bodies in the fixing device, and a polygon motor as the drive source for a polygon mirror. Another configuration known in the art for such an image forming apparatus employs the main motor also as the drive source for the conveying system.

Japanese Patent Application Publication No. H7-334039 discloses a method for controlling start times of two motors in an image forming apparatus. In this method, the image forming apparatus is configured to start a scanner motor (corresponding to the polygon motor) first, and to start the main motor thereafter.

SUMMARY

The peak drive current is highest in a conceivable case where the main motor and the polygon motor are started simultaneously. However, it is not desirable to use a power supply circuit board that has a rated current high enough to allow the peak currents of both motors to flow at the same time. This is because the expense of the circuit board will increase the total cost of the printer. It is preferable to offset the start timings of the two motors.

One of objects of the present disclosure is to shorten a First Print Out Time (FPOT) in an image forming apparatus having a main motor and a polygon mirror.

In order to attain the above and other objects, the disclosure provides an image forming apparatus. The image forming apparatus includes a polygon mirror, a first motor, a photosensitive member, a fixing device, a second motor, a conveyance device, a sensor, and a controller. The polygon mirror is configured to reflect light emitted from a light source. The first motor is configured to rotary drive the polygon mirror. The photosensitive member has an outer peripheral surface to which the light reflected by the polygon mirror emits. The fixing device has a heater, a first member, and a second member. The first member and the second member are configured to convey a sheet interposed therebetween. The fixing device is located downstream of the photosensitive member in a conveying direction of the sheet. The second motor is configured to rotary drive the first member. The conveyance device has a roller configured to

BRIEF DESCRIPTION OF THE DRAWINGS

The particular features and advantages of the disclosure as well as other objects will become apparent from the following description taken in connection with the accompanying drawings, in which:

FIG. 3 is a graph illustrating a relation between time and rotational speeds of a polygon motor and a main motor when the main motor starts prior to the polygon motor;

FIG. 4 is a graph illustrating a relation between time and rotational speeds of the polygon motor and the main motor when the polygon motor starts prior to the main motor;

DETAILED DESCRIPTION

Next, a first embodiment of an image forming apparatus will be described in detail while referring to the accompanying drawings. In this embodiment, the present disclosure is applied to a printer having an electrophotographic image-forming function.

Figure 1:
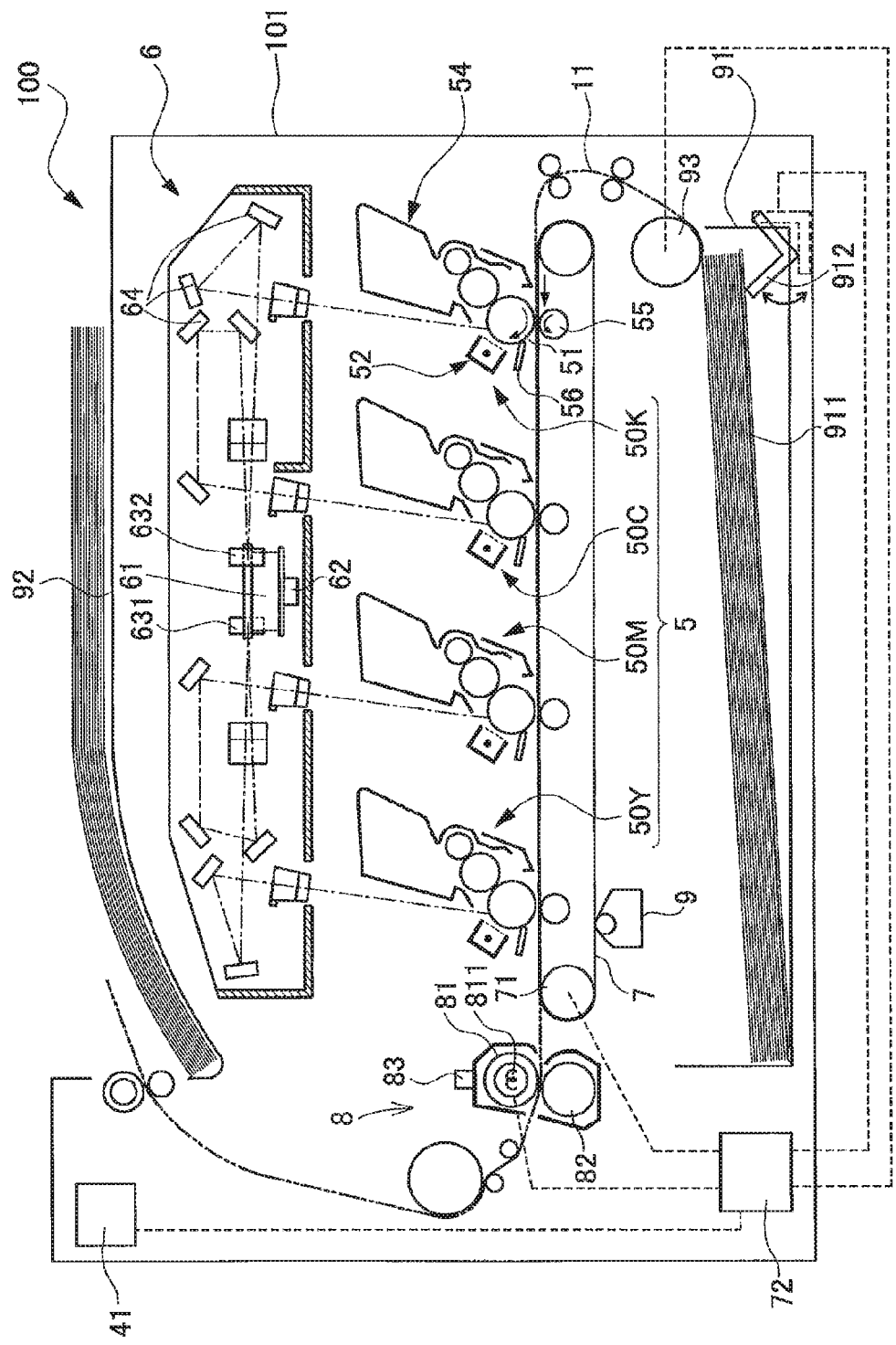
FIG. 1 is a cross section showing internal structure of a printer according to a first embodiment.

FIG. 1 shows the general structure of a printer 100 according to the first embodiment. The printer 100 is an electrophotographic image forming apparatus capable of forming color images. As shown in FIG. 1, the printer 100 includes a main casing 101. The printer 100 further includes a processing device 5, an exposure device 6, a conveying belt 7, a fixing device 8, and a belt cleaner 9, which are accommodated in the main casing 101. The printer 100 is also provided with a sheet-feeding tray 91 for accommodating unprinted sheets, and a discharge tray 92 for accommodating printed sheets. The sheet-feeding tray 91 is an example of the tray.

The conveying belt 7 is an endless belt that is circulated by a conveying roller 71 and the like. The conveying belt 7 circulates in the counterclockwise direction of FIG. 1. The conveying belt 7 conveys sheets fed from the sheet-feeding tray 91 on its outer surface along the bottom of the processing device 5. As indicated by the two-dot chain line in FIG. 1, the printer 100 is provided with a conveying path 11 along which sheets are conveyed. The conveying path 11 extends from the sheet-feeding tray 91 along the upper portion of the conveying belt 7 in FIG. 1 and through the fixing device 8 to the discharge tray 92. The printer 100 is also provided with a feed roller 93 that feeds sheets accommodated in the sheet-feeding tray 91 onto the conveying path 11. The belt cleaner 9 is disposed along the bottom portion of the conveying belt 7 in FIG. 1 for removing residual foreign matter from the conveying belt 7. The conveying belt 7, the conveying roller 71, the feed roller 93 are examples of a conveying device.

As shown in FIG. 1, the processing device 5 includes a yellow processing device 50Y, a magenta processing device 50M, a cyan processing device 50C, and a black processing device 50K. The processing devices 50Y, 50M, 50C, and 50K are disposed at intervals along the upper portion of the conveying belt 7 in FIG. 1. The order in which the processing devices are arranged is not limited to the order of colors in the example of FIG. 1.

As shown in FIG. 1, the black processing device 50K is provided with a photosensitive drum 51. The photosensitive drum 51 rotates clockwise in FIG. 1 to convey sheets interposed between the photosensitive drum 51 and the conveying belt 7. The black processing device 50K further includes a charging device 52, a developing device 54, a transfer roller 55, and a cleaner 56 disposed around the periphery of the photosensitive drum 51. These units are arranged in the order given above along the clockwise direction in FIG. 1. The black processing device 50K accommodates black toner in the developing device 54 and forms a black toner image on the photosensitive drum 51. The other processing devices 50Y, 50M, and 50C have the same structure as the black processing device 50K except that toner images in their respective colors are formed on their corresponding photosensitive drums 51.

The printer 100 is also provided with a main motor 72 for providing driving forces to conveying members such as the conveying roller 71 and the feed roller 93, rotary members such as the photosensitive drum 51 and the transfer roller 55 in each of the processing devices 50Y, 50M, 50C, and 50K, a heating roller 81 in the fixing device 8 described later, and an elevating part 912 described later. The main motor 72 is an example of the second motor.

The exposure device 6 is provided above the processing device 5 in FIG. 1 and is common for all the processing devices 50Y, 50M, 50C, and 50K. The exposure device 6 includes a polygon mirror 61, a polygon motor 62 for rotary driving the polygon mirror 61, two light sources 631 and 632, and a mirror set 64 that includes a plurality of mirrors. The polygon motor 62 is an example of the first motor.

With the exposure device 6 having this configuration, the light sources 631 and 632 output laser beams that are reflected by the polygon mirror 61 and the mirror set 64 and are irradiated onto the surfaces of the photosensitive drums 51 in the processing devices 50Y, 50M, 50C, and 50K. The printer 100 moves the irradiated positions of the laser beams through the rotation of the photosensitive drums 51 and the rotation of the polygon mirror 61. To achieve this, the polygon motor 62 rotates the polygon mirror 61 at a fast and stable speed. Note that the polygon motor 62 is a motor dedicated to the polygon mirror 61 and has a smaller rated current than that of the main motor 72.

As shown in FIG. 1, the fixing device 8 is disposed downstream of the conveying belt 7 in the sheet-conveying direction. The fixing device 8 includes a heating roller 81, and a pressure roller 82. The heating roller 81 and the pressure roller 82 are disposed with the conveying path 11 interposed therebetween. The heating roller 81 is an example of the first fixing member, and the pressure roller 82 is an example of the second fixing member.

The heating roller 81 houses a heater 811 for generating heat to heat the heating roller 81. The pressure roller 82 is a sponge roller that is pressed against the heating roller 81, for example. The main motor 72 rotates the heating roller 81 clockwise in FIG. 1 to convey sheets at a fixing nip point with the pressure roller 82. Note that instead of the heating roller 81 the pressure roller 82 may be driven by the main motor 72 to rotate.

The fixing device 100 is also provided with a temperature sensor 83 that outputs different signals based on the temperature of the heating roller 81. The temperature sensor 83 may be a thermistor, for example, and is an example of the sensor. The printer 100 performs a heating operation for controlling the heater 811 to maintain the temperature of the fixing device 8 within a temperature range suitable for a fixing operation. For example, the printer 100 starts and stops electric conduction to the heater 811 in the heating roller 81 on the basis of output signals from the temperature sensor 83.

In response to a print command, the printer 100 picks up a sheet from the sheet-feeding tray 91 and conveys the sheet along the conveying path 11. In the printer 100 the processing device 5 forms toner images and transfers the toner images onto the sheet as the sheet is conveyed along the conveying path 11.

More specifically, the charging device 52 applies a charge to the surface of the photosensitive drum 51. The exposure device 6 exposes the charged surface of the photosensitive drum 51 to form an electrostatic latent image thereon. The developing device 54 supplies toner to the latent image to form a toner image. The transfer roller 55 transfers the toner image from the photosensitive drum 51 onto the sheet conveyed on the conveying belt 7. The cleaner 56 removes any residual toner or other foreign matter remaining on the photosensitive drum 51 after the tonner is transfer on the sheet from the photosensitive drum 51.

When performing color printing at this time, the printer 100 forms a toner image in each color on the corresponding photosensitive drum 51 of the processing devices 50Y, 50M, 50C, and 50K and superimposes the toner images in the four colors on the sheet. In monochrome printing, on the other hand, the printer 100 forms a toner image only with the black processing device 50K and transfers the black toner image onto the sheet.

After the toner images have been transferred onto the sheet, the sheet is conveyed to the fixing device 8. The fixing device 8 thermally fixes the toner image onto the sheet at the fixing nip between the heating roller 81 and the pressure roller 82. Subsequently, the sheet with the fixed image is discharged onto the discharge tray 92.

As shown in FIG. 1, the printer 100 in the embodiment also includes a pressing plate 911 disposed in the sheet-feeding tray 91, and the elevating part 912 for raising the pressing plate 911. The pressing plate 911 and the elevating part 912 as a set are an example of the pressing-plate unit. The elevating part 912 raises the end of the pressing plate 911 nearest the feed roller 93 toward the feed roller 93. Raising the pressing plate 911 with the elevating part 912 places the topmost sheet of the sheets accommodated on the pressing plate 911 in contact with the feed roller 93.

In the embodiment, the sheet-feeding tray 91 is removably provided in the main casing 101. When the sheet-feeding tray 91 is removed from the main casing 101, the elevating part 912 shifts to a non-elevating position indicated by the dashed line in FIG. 1, allowing the pressing plate 911 to lay flat in the sheet-feeding tray 91. When the sheet-feeding tray 91 is reinserted into the main casing 101, the main motor 72 rotates the elevating part 912 to an elevating position, raising the end of the pressing plate 911. In other words, the elevating part 912 moves the pressing plate 911 between a loading position in which the sheets are separated from the feed roller 93 and an elevated position in which the topmost sheet contacts the feed roller 93. A CPU 31 of the printer 100 described later controls the operations of the elevating part 912.

After initiating the elevating operation of the elevating part 912 for elevating the pressing plate 911, the printer 100 completes the elevating operation when a sensor (not shown) detects that a sheet is in contact with the feed roller 93. After completing the elevating operation, the printer 100 can feed a sheet from the sheet-feeding tray 91 since the sheet on the pressing plate 911 is in contact with the feed roller 93. Note that the elevating part 912 idles when the reaction force from the feed roller 93 becomes too large in order to avoid applying excessive load to the sheets.

Figure 2:
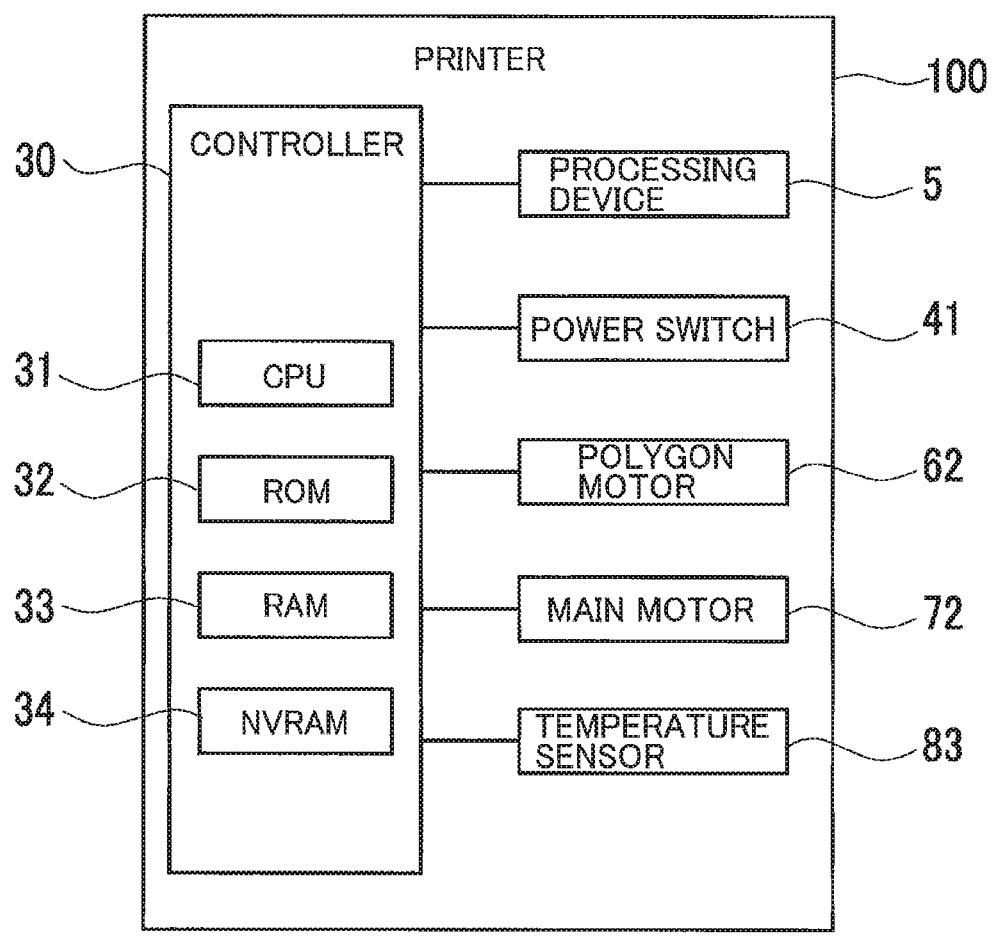
FIG. 2 is a block diagram illustrating electrical configuration of the printer.

Next, the electrical structure of the printer 100 will be described. As shown in FIG. 2, the printer 100 according to the embodiment is provided with a controller 30. The controller 30 has a CPU 31, a ROM 32, a RAM 33, and a nonvolatile RAM (NVRAM) 34. The controller 30 of FIG. 2 is a generic term that covers the CPU 31 and all other hardware used for controlling components in the printer 100 and is not limited to a single piece of hardware present in the printer 100.

The ROM 32 stores firmware and various settings, initial values, and the like. The firmware is a control program for controlling the printer 100. The RAM 33 is used as a work area from which various control programs are read, or a storage area for temporarily storing image data. The NVRAM 34 is used as a storage area for storing various data, settings, and the like.

The CPU 31 controls the components of the printer 100 while storing processing results in the NVRAM 34 on the basis of control programs read from the ROM 32 and signals transmitted from various sensors. The CPU 31 is an example of the controller, the heater control device, and the configuration device. The controller 30 may also be an example of the control device, the heater controller, and the configuration device.

In addition to the processing device 5, the polygon motor 62, the main motor 72, and the temperature sensor 83 described earlier, the printer 100 is also provided with a power switch 41. The controller 30 controls each of these components. The power switch 41 is a switch that toggles the supply of power to the printer 100 on and off.

Next, a startup operation for the printer 100 will be described. The printer 100 may enter a sleep state when input operations have not been received for a prescribed continuous time, for example. In the sleep state, the printer 100 does not supply power at least to the main motor 72, the polygon motor 62, and the heater 811. If a print command is received while the printer 100 is in the sleep state, the printer 100 initiates a startup operation to start the components. The printer 100 begins a printing operation after entering a print-ready state in which it is possible to begin performing a printing operation on a sheet of paper. Note that the printer 100 executes the startup operation after an input operation on the power switch 41 has been received.

In the startup operation, the printer 100 supplies power to various components that include the main motor 72, the polygon motor 62, and the heater 811, and controls the rotational speeds of the main motor 72 and the polygon motor 62 and the temperature of the fixing device 8. The printer 100 determines that the print-ready state has been reached when the rotations of both the polygon motor 62 and the main motor 72 have been stabilized at their corresponding first target rotational speed and second target rotational speed and when the temperature of the fixing device 8 has reached a temperature suitable for fixing operations. An FPOT (first print out time) following a sleep state is the time period that elapses after a print command was received until the first page is outputted into the discharge tray 92. A shorter FPOT can be achieved by reducing the time period that elapses after beginning the startup operation until the printer 100 enters the print-ready state.

Next, the process of starting both the motors 62 and 72 in the startup operation will be described. The printer 100 acquires the revolutions per unit time of each of the motors 62 and 72 (hereinafter called the "rotational speed") based on signals outputted from the corresponding motor on each rotation. The printer 100 determines that each of the motors 62 and 72 has completed startup once the rotational speed of the corresponding motor has reached a target value. Thereafter, the printer 100 controls the motors 62 and 72 to maintain their rotational speeds at the target values. The target rotational speed of the motor and a startup time period required for completing startup for the motor in a halted state are predetermined for each of the motors 62 and 72 in advance.

The drive current supplied to the main motor 72 and the polygon motor 62 temporarily increases to a peak current on startup. The peak current is approximately several times the rated current of the motor. The power supply circuit board in the printer 100 of the embodiment does not have a rated value that would permit the peak current of the main motor 72 and the peak current of the polygon motor 62 to flow simultaneously. Therefore, it is not desirable to start the main motor 72 and the polygon motor 62 at the same time. Hence, the printer 100 in the embodiment initially starts one of the main motor 72 and the polygon motor 62 and starts the other motor at least after startup of the first motor is complete.

The main motor 72 has a larger rated current than the polygon motor 62 and, consequently, a larger peak current, as well. Moreover, after startup is complete, each of the motors 62 and 72 continues to rotate at an unstable speed for a short time. Hence, if the polygon motor 62 were started first and the main motor 72 were subsequently started while the rotation of the polygon motor 62 was still unstable, the maximum current might become too large.

Therefore, when starting the polygon motor 62 first, the printer 100 waits a prescribed time period after startup of the polygon motor 62 is complete and before starting the main motor 72. The prescribed time period is the time period required for stabilizing the rotational speed of the polygon motor 62. More specifically, the prescribed time period is defined as the preparation time period for the polygon motor 62 after starting up the polygon motor 62 so that, during the prescribed time period, a difference between the rotational speed of the polygon motor 62 and the first target rotational speed becomes smaller than or equal to a prescribed threshold and fluctuations in the rotational speed of the polygon motor 62 becomes smaller than or equal to a prescribed amount. In other words, the printer 100 determines preparations to be complete once the prescribed time period has elapsed after startup of the polygon motor 62 is complete, i.e., after the rotational speed of the polygon motor 62 has reached the first target rotational speed. The rotational speed of the polygon motor 62 may be obtained by a sensor provided in the polygon motor 62.

Further, the preparation time period for the main motor 72 is the time period that elapses after initiating startup of the main motor 72 and until the operation for lifting the pressing plate 911 described above is complete. Since sheets cannot be fed until the operation for lifting the pressing plate 911 is complete, the printer 100 is not in a print-ready state while the elevating operation has not been completed. Since the main motor 72 drives the elevating part 912 to elevate the pressing plate 911, the elevating operation begins after the main motor 72 has been started.

As shown in FIGS. 3 and 4, the time period required to complete preparations for both motors 62 and 72 in the printer 100 according to the embodiment differs according to the order in which the motors 62 and 72 are started. FIG. 3 shows the preparation time period required for both motors 62 and 72 when the main motor 72 is started first and the polygon motor 62 second. FIG. 4 shows the preparation time period required for both motors 62 and 72 when the polygon motor 62 is started first and the main motor 72 second. In FIGS. 3 and 4, horizontal axes indicate time and vertical aces indicate rotational speeds of the motors 62 and 72 (rotation number per unit time).

In the printer 100 according to the embodiment, a startup time period km1 for the main motor 72 is shorter than a startup time period kp1 of the polygon motor 62. The polygon motor 62 has a smaller rated current and a faster rotational speed at the completion of startup than the main motor 72. Hence, the polygon motor 62 requires more time for starting up than the main motor 72.

As shown in FIGS. 3 and 4, the startup time period km1 of the main motor 72 is the time interval from a startup timing Sm denoting the timing at which the main motor 72 is started until a startup completion timing Em denoting the timing at which the rotational speed of the main motor 72 reaches the second target rotational speed. Similarly, the startup time period kp1 of the polygon motor 62 denotes the time interval from a startup timing Sp denoting the timing at which the polygon motor 62 is started until a startup completion timing Ep denoting the timing at which the rotational speed of the polygon motor 62 reaches the first target rotational speed. In the printer 100, the startup timings are set so that the startup time period km1 of the main motor 72 does not overlap the startup time period kp1 of the polygon motor 62. The rotational speed of the main motor 62 may be obtained by a sensor provided in the main motor 72.

When the main motor 72 is started first and the polygon motor 62 is started after startup of the main motor 72 is complete, as shown in FIG. 3, the total time for both motors 62 and 72 to become ready is the sum of the startup time period km1 of the main motor 72, the startup time period kp1 of the polygon motor 62, and a prescribed time period kp2. Here, the prescribed time period kp2 is a prescribed time period required for stabilizing the rotation of the polygon motor 62 after startup of the polygon motor 62 is complete. Further, an elevating time period km2 denotes the time period required after the main motor 72 is started until the elevating operation of the elevating part 912 is complete. Each of the startup time period kp1, the prescribed time period kp2, and the startup time period km1 may be a predetermined constant. The elevating time period km2 differs according to the amount of sheets accommodated in the sheet-feeding tray 91. The elevating time period km2 may be estimated on the basis of the amount of sheets accommodated in the sheet-feeding tray 91. For example, the elevating time period km2 may be proportional to the amount of sheets accommodated in the sheet-feeding tray 91. The elevating time period km2 is longer than the startup time period km1 of the main motor 72 and shorter than the sum of the startup time period km1, the startup time period kp1, and the prescribed time period kp2.

When the polygon motor 62 is started first and the main motor 72 is started after startup of the polygon motor 62 is complete, as illustrated in FIG. 4, the total time required for both motors 62 and 72 to become ready is the sum of the startup time period kp1 of the polygon motor 62, the prescribed time period kp2, and the elevating time period km2. As described above, the main motor 72 is started once the prescribed time period kp2 has elapsed after startup of the polygon motor 62 is complete.

Since the elevating time period km2 is longer than the startup time period km1, the time period required for the polygon motor 62 and the main motor 72 to become ready when the polygon motor 62 is started first is longer than the time period required for the motors 62 and 72 to become ready when the main motor 72 is started first.

Next, preliminary operations coupled with heating control of the fixing device 8 will be described. In response to receiving a print command, the CPU 31 acquires a control starting temperature T0 based on the output signal from the temperature sensor 83. The control starting temperature T0 indicates the temperature of the fixing device 8 at the start of the control (at a beginning of motor start up process described later). When the control starting temperature T0 is lower than the prescribed fixing temperature, the CPU 31 begins conducting electricity to the heater 811 to heat the heating roller 81.

The printer 100 is not provided with a member for interrupting drive transmission between the main motor 72 and the heating roller 81 of the fixing device 8. In other words, the heating roller 81 rotates when the main motor 72 rotates. Heat in the heating roller 81 is more likely to be lost to peripheral members when the heating roller 81 is rotating, making it more difficult to raise the temperature of the heating roller 81 than when the heating roller 81 is not rotating. That is, the rate of temperature rise α (° C./s) of the heating roller 81 when the main motor 72 is halted is higher than the rate of temperature rise β (° C./s) of the heating roller 81 when the main motor 72 is rotating.

As described above, the time required for both the motors 62 and 72 to become ready is shorter when the main motor 72 is started prior to the polygon motor 62 than when the polygon motor 62 is started prior to the main motor 72. On the other hand, the rate of temperature rise of the fixing device 8 is high in an interval from the moment when heat control begins until the main motor 72 is started, and low after the main motor 72 is started. Hence, when the fixing device 8 is at a low temperature, requiring more time to raise its temperature, the time required for both the motors 62 and 72 to become ready can be reduced by starting the polygon motor 62 first and delaying startup of the main motor 72, thereby securing more time to raise the temperature of the fixing device 8 at a higher rate.

On the other hand, if the polygon motor 62 is started first when the temperature of the fixing device 8 is high, startup of the main motor 72 is delayed, delaying the timing at which sheet conveyance begins. Consequently, the first sheet does not arrive at the fixing device 8 though the temperature of the fixing device 8 has reached the target fixing temperature. An FPOT in this case would be longer than when the main motor 72 is started first. Accordingly, the CPU 31 of the embodiment starts the main motor 72 before the polygon motor 62 when the temperature of the fixing device 8 is high. With this method, the printer 100 can begin conveying sheets at an earlier timing than when the polygon motor 62 is started first, reducing a time period from a timing when the temperature of the fixing device 8 reaches the target temperature to a timing when the first sheet reaches the fixing device 8 and, hence, reducing the FPOT.

The printer 100 of the embodiment sets the startup order for the motors 62 and 72 based on whether the control starting temperature T0 is higher than a threshold temperature T1. The CPU 31 starts the polygon motor 62 prior to the main motor 72 when the control starting temperature T0 is lower than the threshold temperature T1. The printer 100 starts the main motor 72 prior to the polygon motor 62 when the control starting temperature T0 is higher than or equal to the threshold temperature T1. The threshold temperature T1 is used as the condition for setting the motor startup order. The threshold temperature T1 is determined on the basis of the relationships among the rates of temperature rise α and β and the preparation time period for each of the motors 62 and 72. The threshold temperature T1 is stored in the ROM 32 or the NVRAM 34. The threshold temperature T1 is an example of the first threshold value.

Figure 5:
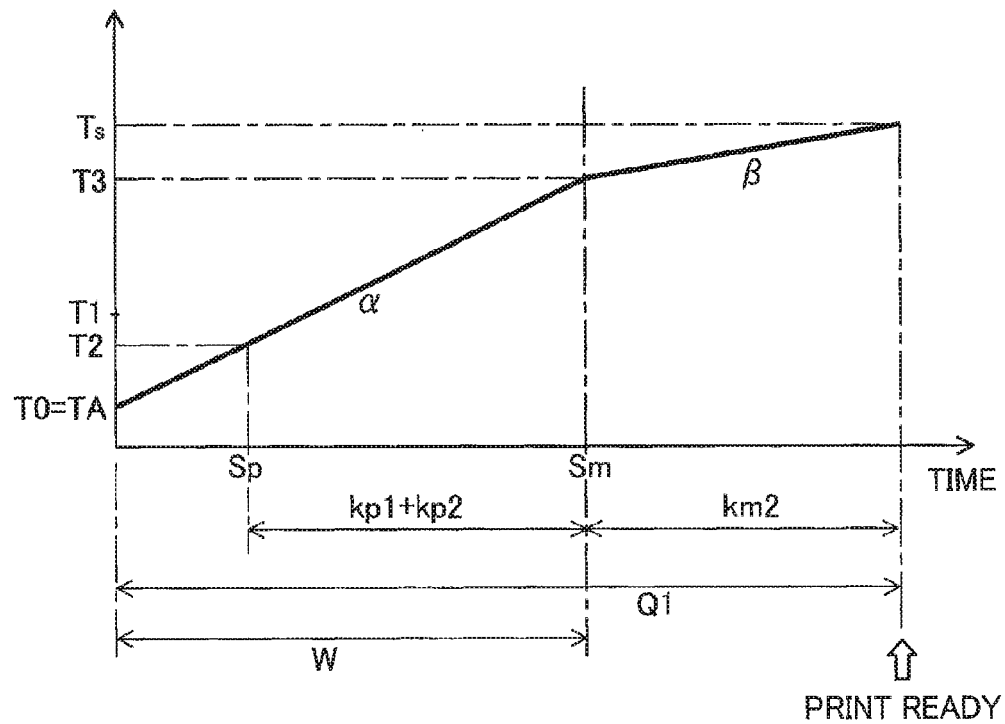
FIG. 5 is a graph illustrating a relation between time and temperature of a fixing device when the polygon motor starts prior to the main motor.
Figure 6:
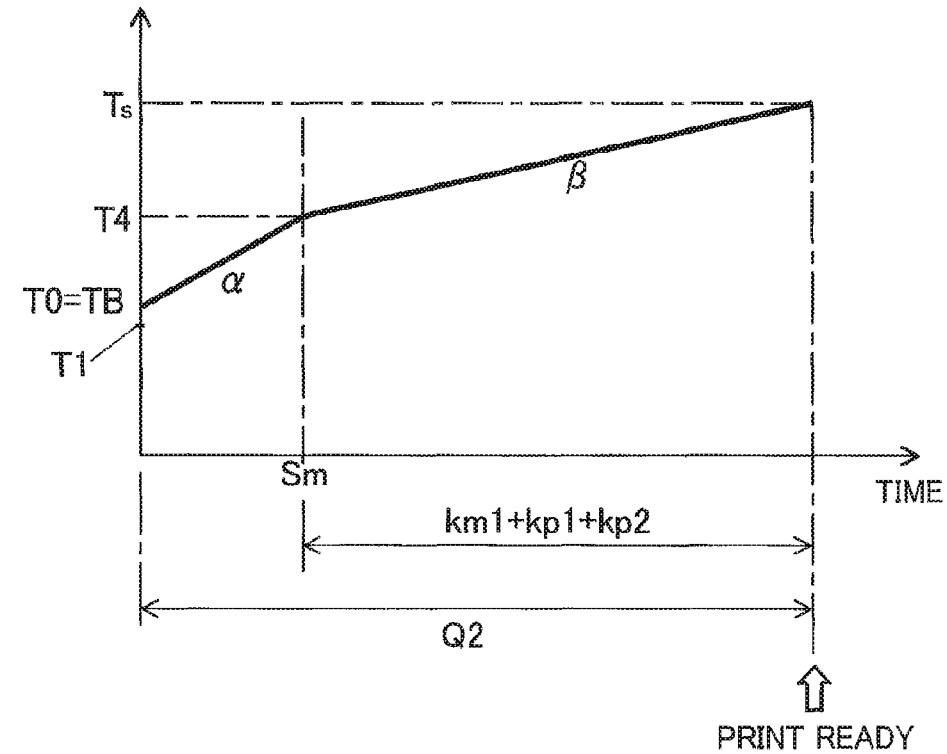
FIG. 6 is a graph illustrating a relation between time and temperature of the fixing device when the main motor starts prior to the polygon motor.

Next, the relationships between the startup order of the motors 62 and 72 and the temperature changes in the fixing device 8 will be described with reference to FIGS. 5 and 6. In FIGS. 5 and 6, horizontal axes indicate time and vertical axes indicate temperature of the fixing device 8. FIG. 5 shows the time period required for the temperature of the fixing device 8 to rise to the target temperature when the control starting temperature T0 is at a low temperature TA below the threshold temperature T1. FIG. 6 shows the time period required for the temperature of the fixing device 8 to rise to the target temperature when the control starting temperature T0 is at a high temperature TB higher than the threshold temperature T1.

When the control starting temperature T0 is lower than the threshold temperature T1, as shown in FIG. 5, the motors are started up in the order of the polygon motor 62 first and the main motor 72 second. Here, heating of the fixing device 8 begins while the main motor 72 is in a halted state so that the temperature of the fixing device 8 rises from the temperature TA at the rate of temperature rise α. The CPU 31 starts the polygon motor 62 when the temperature of the fixing device 8 exceeds (or reaches) a second temperature T2, and starts the main motor 72 when the temperature of the fixing device 8 reaches a third temperature T3. Beginning from the startup timing Sm of the main motor 72, the temperature of the fixing device 8 rises at the rate of temperature rise β. Here, T2<T1<T3. The second temperature T2 is an example of the second threshold value, and the third temperature T3 is an example of the third threshold value.

In this case, in order to minimize the total preparation time period required for the printer 100 to reach a print-ready state from a sleep state after a print command has been received, the motors 62 and 72 should be started so that the temperature of the fixing device 8 reaches a conveyance starting temperature Ts at the timing when preparation of the main motor 72 is complete. The conveyance starting temperature Ts is the temperature of the fixing device 8 for starting the conveyance of the sheet. Specifically, the conveyance starting temperature Ts is the lower limit temperature that is set so that the temperature of the fixing device 8 is anticipated to reach a print-ready temperature at a timing when the sheet reaches the fixing device 8 in a case where the conveyance of the sheet starts at the conveyance starting temperature Ts and the heating operation of the fixing device 8 is maintained. Here, the print-ready temperature is a temperature at which the printing operation can be performed. The conveyance starting temperature Ts is an example of the lower limit temperature. Further, the print-ready temperature is an example of the target temperature.

The third temperature T3 is the temperature of the fixing device 8 at the startup timing Sm of the main motor 72. In other words, the third temperature T3 shown in FIG. 5 for minimizing the total preparation time period is set according to the following Equation 1.

$$T3 = Ts - \beta \times km2 \qquad \text{Equation 1}$$

While the fixing device 8 maintains heating, the printer 100 begins conveying a sheet to be printed once the temperature of the fixing device 8 has reached the prescribed conveyance starting temperature Ts.

The second temperature T2 is defined so that the polygon motor 62 is started when the temperature of the fixing device 8 reaches the second temperature T2. The second temperature T2 is determined so that the fixing device 8 will rise to the third temperature T3 after the startup time period kp1 and the prescribed time period kp2 of the polygon motor 62 have elapsed from the timing when the temperature of the fixing device 8 reaches the second temperature T2 (or the timing when the polygon motor 62 is started). The second temperature T2 in the example of FIG. 5 is set according to the following Equation 2.

$$T2 = T3 - \alpha \times (kp1 + kp2)$$

$$= Ts - \beta \times km2 - \alpha \times (kp1 + kp2) \qquad \text{Equation 2}$$

The polygon motor 62 may be started prior to the timing when the fixing device 8 reaches the second temperature T2. The total preparation time period does not change even if the polygon motor 62 is started prior to the timing when the fixing device 8 reaches the second temperature T2. However, the polygon motor 62 is preferably started after the fixing device 8 reaches the second temperature T2 in order to reduce power consumption by reducing the time interval for controlling the polygon motor 62.

As shown in FIG. 5, the time interval from the start of control to the startup timing Sp for the polygon motor 62, i.e., the time period required for the temperature of the fixing device 8 to reach the second temperature T2 is $(T2-TA)/\alpha$. Here, TA indicates the temperature of the fixing device 8 at the timing for starting control, that is, TA is equal to T0. Hence, a total preparation time period Q1 in this example is expressed by the following Equation 3.

$$Q1 = (T2 - TA)/\alpha + kp1 + kp2 + km2 \qquad \text{Equation 3}$$

Note that while FIG. 5 shows an example in which the temperature TA for starting control satisfies the expression TA<T2, the CPU 31 starts the polygon motor 62 at approximately the timing when the CPU 31 starts heat control of the fixing device 8 when T2≤TA<T1. When the control starting temperature T0 is higher than the second temperature T2, the time required for completing preparation of both the motors 62 and 72 is longer than the time required for the temperature of the fixing device 8 to reach the conveyance starting temperature Ts. The total preparation time period Q1 when T2≤TA<T1 is shorter than when TA<T2 and is expressed by the following Equation 4.

$$Q1 = kp1 + kp2 + km2 \qquad \text{Equation 4}$$

However, when the control starting temperature T0 is higher than the threshold temperature T1, as illustrated in FIG. 6, the motor startup order is set to the main motor 72 first and the polygon motor 62 second. In this case, heating of the fixing device 8 is also started while the main motor 72 is in a halted state so that the temperature of the fixing device 8 rises from the temperature TB at the rate of temperature rise α. Here, TB indicates the temperature of the fixing device 8 at the timing for starting control, that is, TB is equal to T0. The CPU 31 starts the main motor 72 after the temperature of the fixing device 8 exceeds (or reaches) a fourth temperature T4. After the CPU 31 starts the main motor 72, the temperature of the fixing device 8 rises at the rate of temperature rise β. As shown in FIG. 3, the CPU 31 starts the polygon motor 62 once the startup time period km1 of the main motor 72 has elapsed after the startup timing Sm of the main motor 72. Here, T1<T4<Ts. The fourth temperature T4 is an example of the fourth threshold value.

In this case, in order to minimize the total preparation time period required for the printer 100 to reach a print-ready state after a print command is received during a sleep state, the motors 62 and 72 should be started so that the temperature of the fixing device 8 reaches the conveyance starting temperature Ts at the time when preparation of the polygon motor 62 is completed. The fourth temperature T4 is the temperature of the fixing device 8 at the startup timing Sm of the main motor 72. Hence, the fourth temperature T4 in FIG. 6 for minimizing the total preparation time period is set according to the following Equation 5.

$$T4 = Ts - \beta \times (km1 + kp1 + kp2) \qquad \text{Equation 5}$$

As described above, (km1+kp1+kp2)>km2 in the printer 100 according to the embodiment. Hence, a comparison of Equations 1 and 5 indicates T4<T3.

As shown in FIG. 6, the time period elapsed after control (motor startup process) is started until the startup timing Sm of the main motor 72, i.e., the time period required for the temperature of the fixing device 8 to reach the fourth temperature T4, is $(T4-TB)/\alpha$. Therefore, a total preparation time period Q2 in this example is expressed by the following Equation 6.

$$Q2 = (T4 - TB)/\alpha + km1 + kp1 + kp2 \qquad \text{Equation 6}$$

FIG. 6 shows an example in which the temperature TB at the start of control satisfies the expression TB<T4. However, when the expression T4≤TB is satisfied, the CPU 31 starts the main motor 72 at approximately the same timing when heat control for the fixing device 8 is started. When the control starting temperature T0 is higher than the fourth temperature T4, the time period required to complete preparation for both the motors 62 and 72 is longer than the time period required for the temperature of the fixing device 8 to reach the conveyance starting temperature Ts. Therefore, the total preparation time period Q2 when T4≤TB is shorter than when TB<T4, as expressed in the following Equation 7. Note that Q2<Q1 in the embodiment.

$$Q2 = km1 + kp1 + kp2 \qquad \text{Equation 7}$$

The threshold temperature T1 is the temperature at which no difference is produced in total preparation time period based on the starting order of the polygon motor 62 and the main motor 72. Found from Equation 8 below, the threshold temperature T1 is the temperature at which the shortest total preparation time period Q1 described above (Equation 4) is equivalent to the total preparation time period Q2 (Equation 6, substituting T1 for TB).

$$kp1 + kp2 + km2 = (T4 - T1)/\alpha + km1 + kp1 + kp2$$

$$T1 = T4 - \alpha \times (km2 - km1) \qquad \text{Equation 8}$$

In other words, the threshold temperature T1 is lower than the fourth temperature T4. Since T4<T3, as described above, the threshold temperature T1 is lower than the third temperature T3. The fourth temperature T4 is the temperature of the fixing device 8 at the startup timing Sm of the main motor 72 when the main motor 72 is started before the polygon motor 62. The third temperature T3 is the temperature of the fixing device 8 at the startup timing Sm of the main motor 72 when the polygon motor 62 is started before the main motor 72.

Note that the threshold temperature T1, the second temperature T2, the third temperature T3, and the fourth temperature T4 are stored in the ROM 32 or the NVRAM 34. The CPU 31 determines the motor startup order based on the output signal from the temperature sensor 83 and sets the startup temperature for the main motor 72 to either the third temperature T3 or the fourth temperature T4. The threshold temperature T1 is lower than both of the third temperature T3 and the fourth temperature T4.

Next, steps in a motor startup process executed by the printer 100 will be described with reference to the flowchart in FIG. 7. The CPU 31 of the printer 100 executes the motor startup process in response to receiving a print command while the printer 100 is in a sleep state, i.e., while the printer 100 is not supplying electricity to the motors 62 and 72.

In S101 at the beginning of the motor startup process, the CPU 31 acquires, as the control starting temperature T0, the temperature of the fixing device 8 on the basis of an output signal from the temperature sensor 83. In S102 the CPU 31 starts heat control for the fixing device 8. S102 is an example of the heating process. For heat control, the CPU 31 begins supplying electricity to the heater 811 if the temperature of the fixing device 8 is lower than the target temperature (the print-ready temperature).

Note that the temperature acquired by the CPU 31 is not limited to a temperature specified by the output signal from the temperature sensor 83. For example, the CPU 31 may acquire a drive time indicating the length of time that electricity was conducted to the heater 811 for heating the heating roller 81, and a stopped time indicating the length of time that the heater 811 was not heated and may estimate the temperature on the basis of these times. Further, the CPU 31 may estimate the temperature on the basis of whether the operating state of the printer 100 is the print-ready state or the sleep state, or may estimate the temperature on the basis of the length of time elapsed after the printer 100 was woken from a sleep state.

In S103 the CPU 31 determines whether the temperature of the fixing device 8 acquired in S101 is lower than the prescribed threshold temperature T1. When the temperature of the fixing device 8 is lower than the threshold temperature T1 (S103: YES), in S104 the CPU 31 determines whether a counter exceeds a prescribed number. The counter indicates the number of times that the polygon motor 62 was started prior to the main motor 72 and is stored in the NVRAM 34.

When the printer 100 of the embodiment starts the polygon motor 62 prior to the main motor 72, laser beams are irradiated onto the photosensitive drums 51 while the photosensitive drums 51 are idle (not rotated) until the main motor 72 is started. For example, a laser beam is irradiated for at least one scan when the polygon motor 62 is started in order to adjust the rotated angle of the polygon mirror 61. Irradiating a laser beam repeatedly over an idle photosensitive drum 51 too many times may accelerate wear of the photosensitive drum 51. Accordingly, the printer 100 counts the number of times that the startup order is set to the polygon motor 62 first and, when the count value exceeds a prescribed number, the printer 100 starts the main motor 72 first regardless of the temperature of the fixing device 8 at the start of control. This method can suppress damage to the photosensitive drums 51.

When the CPU 31 determines that the counter does not exceed the prescribed number (S104: NO), in S105 the CPU 31 executes a polygon motor first startup process. However, when the temperature of the fixing device 8 is not lower than the threshold temperature T1 (S103: NO), or when the counter exceeds the prescribed number (S104: YES), in S106 the CPU 31 executes a main motor first startup process.

In other words, when the temperature of the fixing device 8 is lower than the threshold temperature T1 and the number of times that the polygon motor 62 has been started up prior to the main motor 72 is not large, the CPU 31 sets the motor startup order to the polygon motor 62 first and the main motor 72 second. On the other hand, when the temperature of the fixing device 8 is not lower than the threshold temperature T1 or when the number of times that the polygon motor 62 has been started up before the main motor 72 is large, the CPU 31 sets the motor startup order to the main motor 72 first and the polygon motor 62 second.

Figure 8:
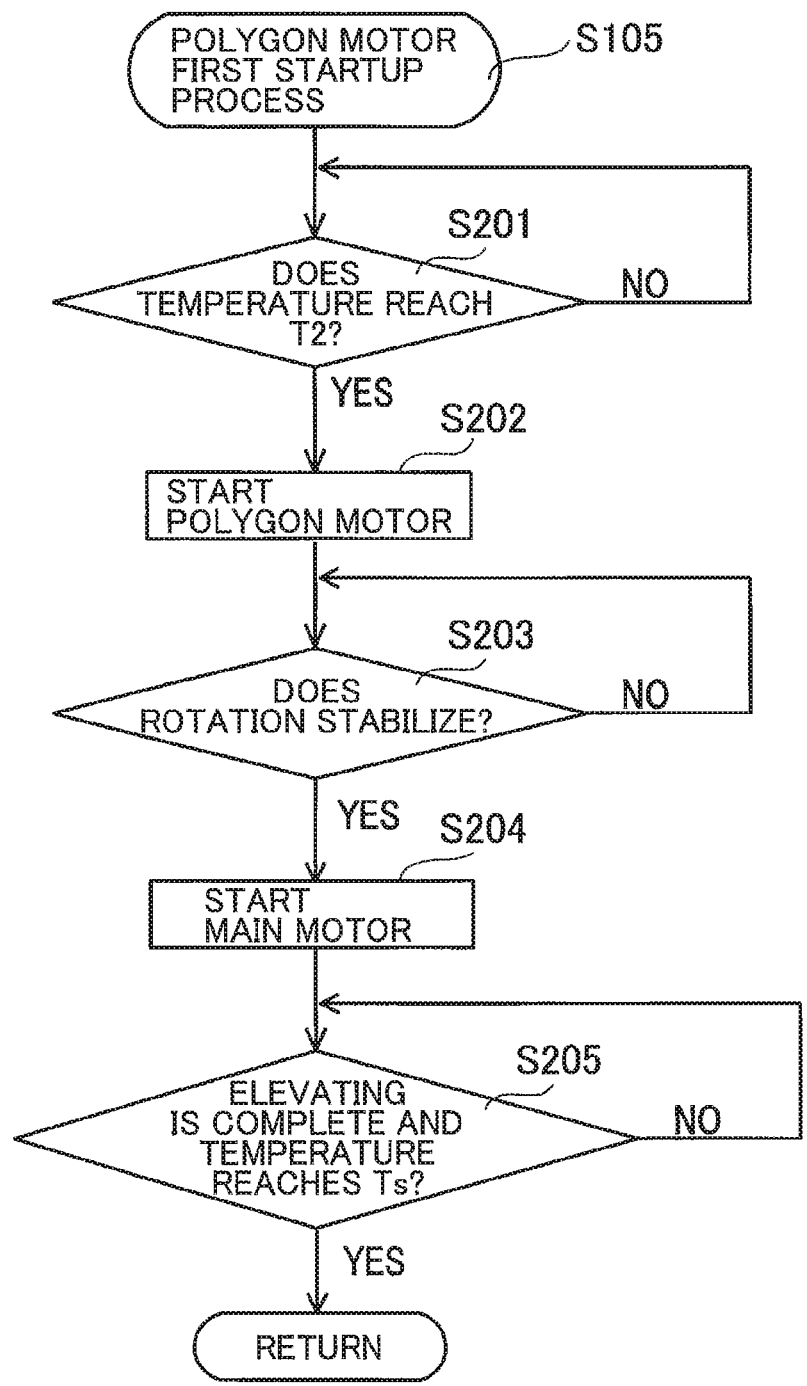
FIG. 8 is a flowchart illustrating a polygon motor first startup process according to the first embodiment.

Next, steps in the polygon motor first startup process executed in S105 of the motor startup process will be described with reference to the flowchart in FIG. 8. In S201 of the polygon motor first startup process, the CPU 31 determines whether the temperature of the fixing device 8 has reached the prescribed second temperature T2.

When the temperature of the fixing device 8 has not yet reached the second temperature T2 (S201: NO), the CPU 31 continues heating the fixing device 8 with the heater 811 until the temperature of the fixing device 8 reaches the second temperature T2. Since the CPU 31 began energizing the heater 811 in S102 of the motor startup process, the temperature of the fixing device 8 rises over time.

When the temperature of the fixing device 8 has reached the second temperature T2 (S201: YES), in S202 the CPU 31 starts the polygon motor 62. Startup of the polygon motor 62 is determined to be complete when the rotational speed of the polygon motor 62 reaches the first target rotational speed, or when the difference between the rotational speed of the polygon motor 62 and the first target rotational speed becomes smaller than or equal to a prescribed threshold, or when the startup time period kp1 has elapsed from the timing when the polygon motor 62 starts. In S203 the CPU 31 determines whether a prescribed time period required for the rotation to stabilize has elapsed after startup of the polygon motor 62 is complete and whether the temperature of the fixing device 8 has reached the prescribed third temperature T3.

When the rotation of the polygon motor 62 has not stabilized or when the fixing device 8 has not reached the third temperature T3 (S203: NO), the CPU 31 maintains operations until the above conditions have been met. When the CPU 31 determines that the rotation of the polygon motor 62 has stabilized and that the fixing device 8 has reached the third temperature T3 (S203: YES), in S204 the CPU 31 starts the main motor 72.

In S205 the CPU 31 determines whether the elevating operation for the pressing plate 911 is complete and whether the temperature of the fixing device 8 has reached the conveyance starting temperature Ts. When the elevating operation for the pressing plate 911 is not complete or when the temperature of the fixing device 8 has not yet reached the conveyance starting temperature Ts (S205: NO), the CPU 31 waits until these conditions are met. Once the elevating operation for the pressing plate 911 is complete and the temperature of the fixing device 8 has reached the conveyance starting temperature Ts (S205: YES), the CPU 31 ends the polygon motor first startup process.

Figure 7:
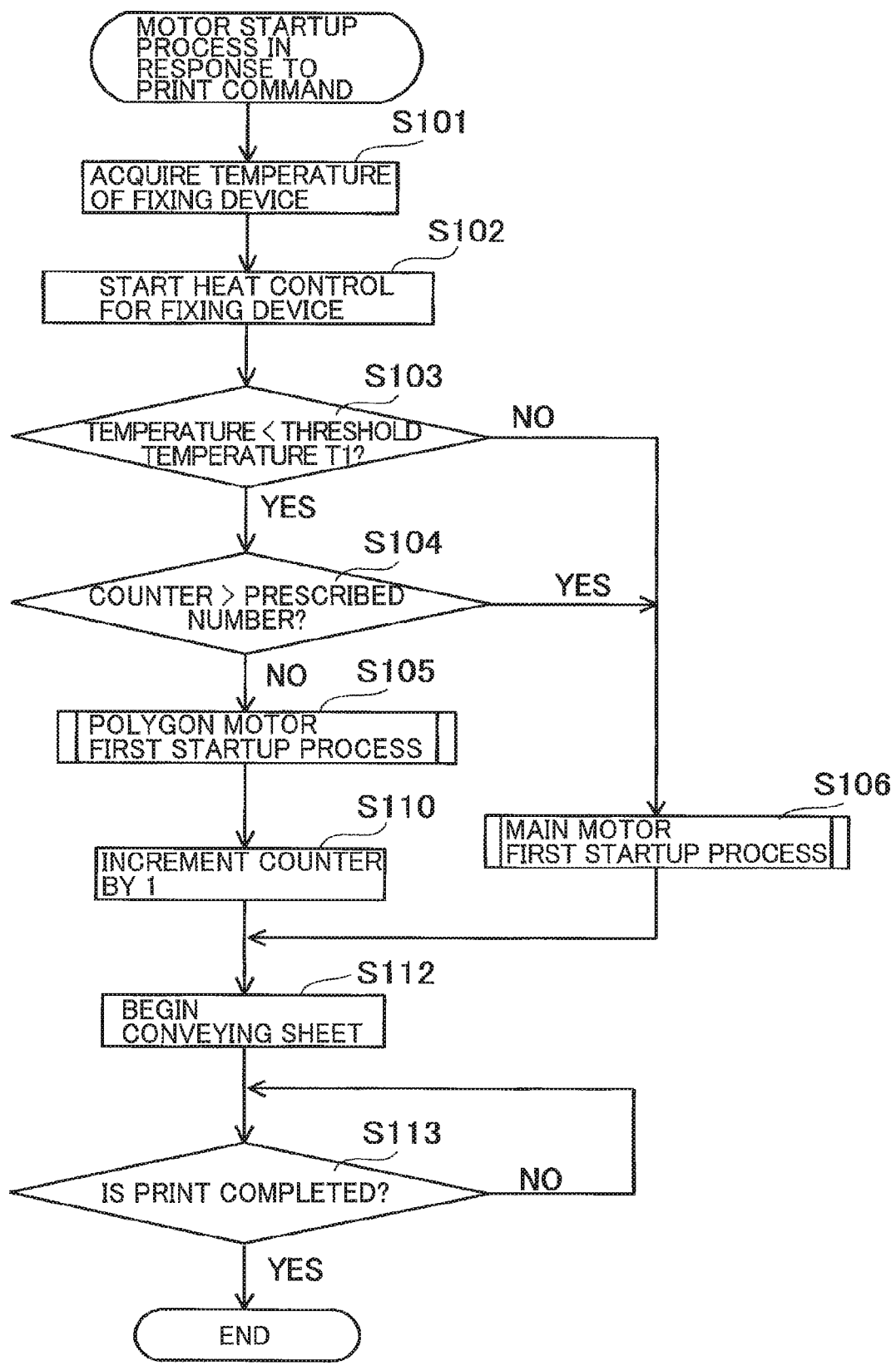
FIG. 7 is a flowchart illustrating a motor startup process according to the first embodiment.

Returning to the motor startup process of FIG. 7, after the CPU 31 completes the polygon motor first startup process in S105, in S110 the CPU 31 increments the counter by 1 and in S112 begins conveying a sheet of paper. Further, the CPU 31 controls operations of the processing device 5 and other components at a timing synchronized with conveyance of the sheet to begin a printing operation.

In S113 the CPU 31 determines whether a printing operation based on the received print command has completed. When the CPU 31 determines that the printing operation has not completed (S113: NO), the CPU 31 waits until this condition is met. When the CPU 31 determines that the printing operation has completed (S113: YES), the CPU 31 ends the motor startup process.

Figure 9:
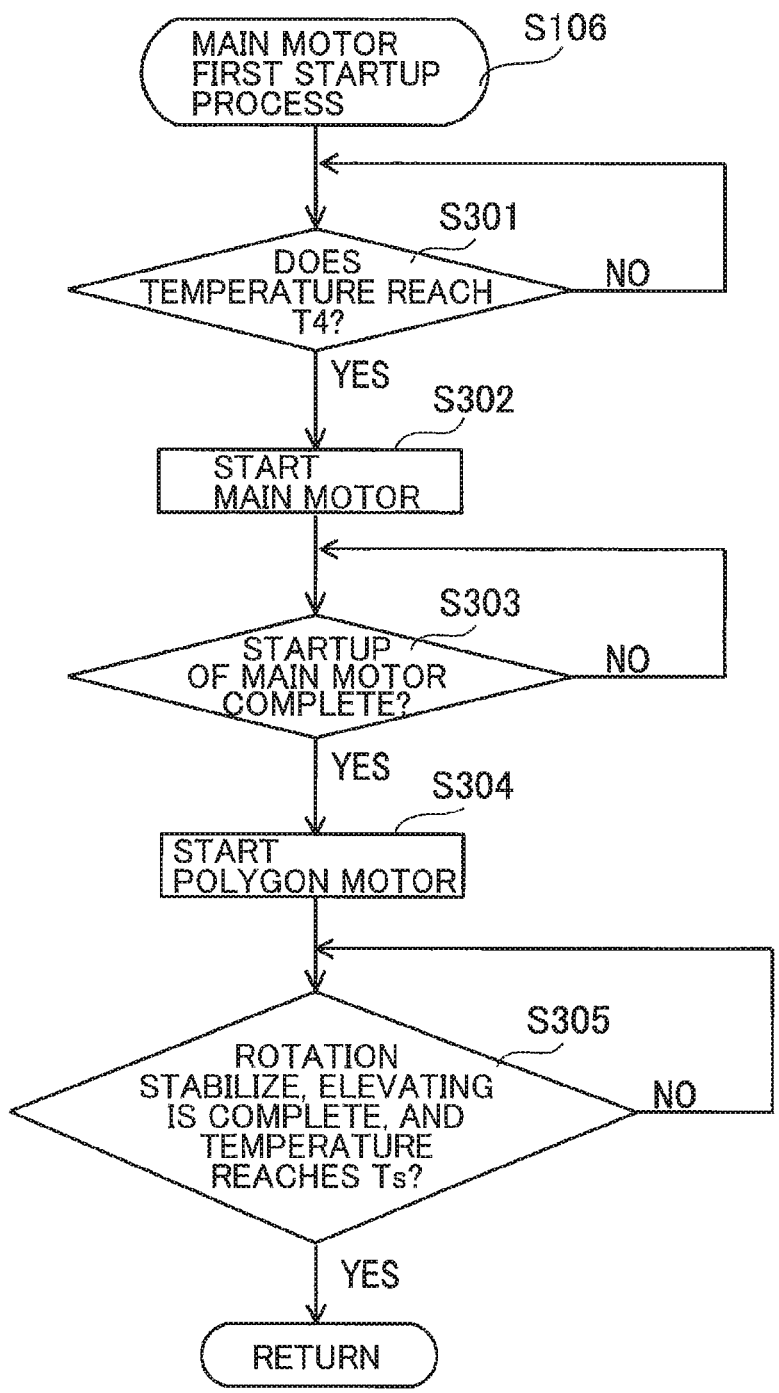
FIG. 9 is a flowchart illustrating a main motor first startup process according to the first embodiment.

Next, steps in the main motor first startup process (S106) executed when the CPU 31 reaches a NO determination in S103 or a YES determination in S104 will be described with reference to the flowchart in FIG. 9. In S301 of the main motor first startup process, the CPU 31 first determines whether the temperature of the fixing device 8 has reached the prescribed fourth temperature T4. When the temperature of the fixing device 8 has not yet reached the fourth temperature T4 (S301: NO), the CPU 31 continues heating the fixing device 8 with the heater 811 until the temperature of the fixing device 8 reaches the fourth temperature T4.

When the CPU 31 determines that the temperature of the fixing device 8 has reached the fourth temperature T4 (S301: YES), in S302 the CPU 31 starts the main motor 72. In S303 the CPU 31 determines whether startup of the main motor 72 is complete. The CPU 31 may determine that the startup of the main motor 72 is complete when the rotational speed of the main motor 72 reaches the second target rotational speed, or when the temperature of the fixing device 8 reaches a startup complete temperature, or when the startup time period km1 has elapsed from the timing when the main motor 72 starts in S302. Here, the startup complete temperature is obtained by T4+km1/β. When startup of the main motor 72 is not complete (S303: NO), the CPU 31 continues the startup operation for the main motor 72.

When the CPU 31 determines that startup of the main motor 72 is complete (S303: YES), in S304 the CPU 31 starts the polygon motor 62. Because the main motor 72 starts rotating in S302, the elevating operation for the pressing plate 911 starts. In S305 the CPU 31 determines whether rotation of the polygon motor 62 has stabilized and whether the elevating operation for the pressing plate 911 is complete and whether the temperature of the fixing device 8 has reached the conveyance starting temperature Ts. When the CPU 31 determines that any one of these conditions has not been met (S305: NO), the CPU 31 waits until all the conditions are met.

Once the CPU 31 has determined that rotation of the polygon motor 62 is stable, the elevating operation for the pressing plate 911 is complete, and the temperature of the fixing device 8 has reached the conveyance starting temperature Ts (S305: YES), the CPU 31 ends the main motor first startup process.

Returning to the motor startup process in FIG. 7, after the CPU 31 has completed the main motor first startup process of S106, in S112 the CPU 31 begins conveying a sheet and executes a printing operation. In S113 the CPU 31 determines whether the printing operation for the received print command has completed. When the CPU 31 determines that the printing operation has not completed (S113: NO), the CPU 31 waits until this condition is met. When the CPU 31 determines that the printing operation has completed (S113: YES), the CPU 31 ends the motor startup process.

Note that the printer 100 according to the embodiment starts the main motor 72 first when the control starting temperature T0 is equivalent to the threshold temperature T1. In this case, there is almost no difference in the total preparation time period, regardless of which motor is started first. However, the peak of the maximum current tends to be higher when the polygon motor 62 is started first than when the main motor 72 is started first and, hence, the power consumption tends to be higher. Accordingly, if the control starting temperature T0 and the threshold temperature T1 are equivalent, the printer 100 according to the embodiment starts the main motor 72 first, thereby reducing the frequency in which the polygon motor 62 is started before the main motor 72 and reducing power consumption.

As described above, the printer 100 according to the first embodiment includes the polygon motor 62 for driving the polygon mirror 61 to rotate, and the main motor 72 for driving the conveying belt 7, the heating roller 81 of the fixing device 8, and the like to rotate. In response to reception of a print command, the printer 100 determines the motor startup order based on the temperature of the fixing device 8. That is, when the control starting temperature T0 is lower than the threshold temperature T1, the printer 100 starts the polygon motor 62 prior to the main motor 72. When the control starting temperature T0 is higher than the threshold temperature T1, the printer 100 starts the main motor 72 prior to the polygon motor 62. When the control starting temperature T0 is lower than the threshold temperature T1, the polygon motor 62 starts rotating prior to the main motor 72. In this case, an heating time period, which is required to raise the temperature of the fixing device 8 when the fixing device 8 is heated at the rate of temperature rise α, can be longer than when the main motor 72 starts rotating prior to the polygon motor 62, thereby reducing the total heating time for heating the heating roller 81. Further, because in the heating time period, the polygon motor 62 starts rotating, the rotation of the polygon motor 62 can be surely stabilized. Accordingly, the total preparation time period can be shorten than when the main motor 72 starts rotating prior to the polygon motor 62.

On the other hand, when the control starting temperature T0 is higher than the threshold temperature T1, the main motor 72 starts rotating prior to the polygon motor 62. In this case, the timing when the main motor 72 starts rotating is faster than that in a case where the polygon motor 62 starts rotating prior to the main motor 72. Specifically, higher the control starting temperature T0 is, the shorter the time period required to reach the conveyance starting temperature Ts is. In other words, the higher the control starting temperature T0 is, the shorter the time period required to reach a main-motor-start temperature of the fixing device 8 at which the main motor 72 should start rotating (the fourth temperature T4, for example) is. The preparation time for the polygon motor 62 is substantially constant. It is conceivable that the polygon motor 62 starts first when the control starting temperature T0 is higher than the threshold temperature T1. In this conceivable case, the polygon motor 62 does not stabilize at a timing when the temperature of the fixing device 8 reaches the main-motor-start temperature, and thus the main motor 72 could not start at this timing, whereby a start timing of the main motor 72 would be late. In the present disclosure, the main motor 72 starts rotating prior to the polygon motor 62. In this case, the main motor 72 can surely starts at a timing when the temperature of the fixing device 8 reaches the main-motor-start temperature. Accordingly, the total preparation time period can be reduced than when the polygon motor 62 starts rotating prior to the main motor 72.

It is possible to reduce the FPOT required from the moment a print command is received until the first printed page is outputted, regardless the temperature of the fixing device 8 at the start of control.

Next, a second embodiment of the present disclosure will be described while referring to the accompanying drawings. The printer 100 according to the second embodiment has the same structure as the printer 100 in the first embodiment, and only the method of setting the motor startup order is different. In the following description, like parts and components to those in the first embodiment are designated with the same reference numerals and like process steps are designated with the same step numbers to avoid duplicating description.

Figure 10:
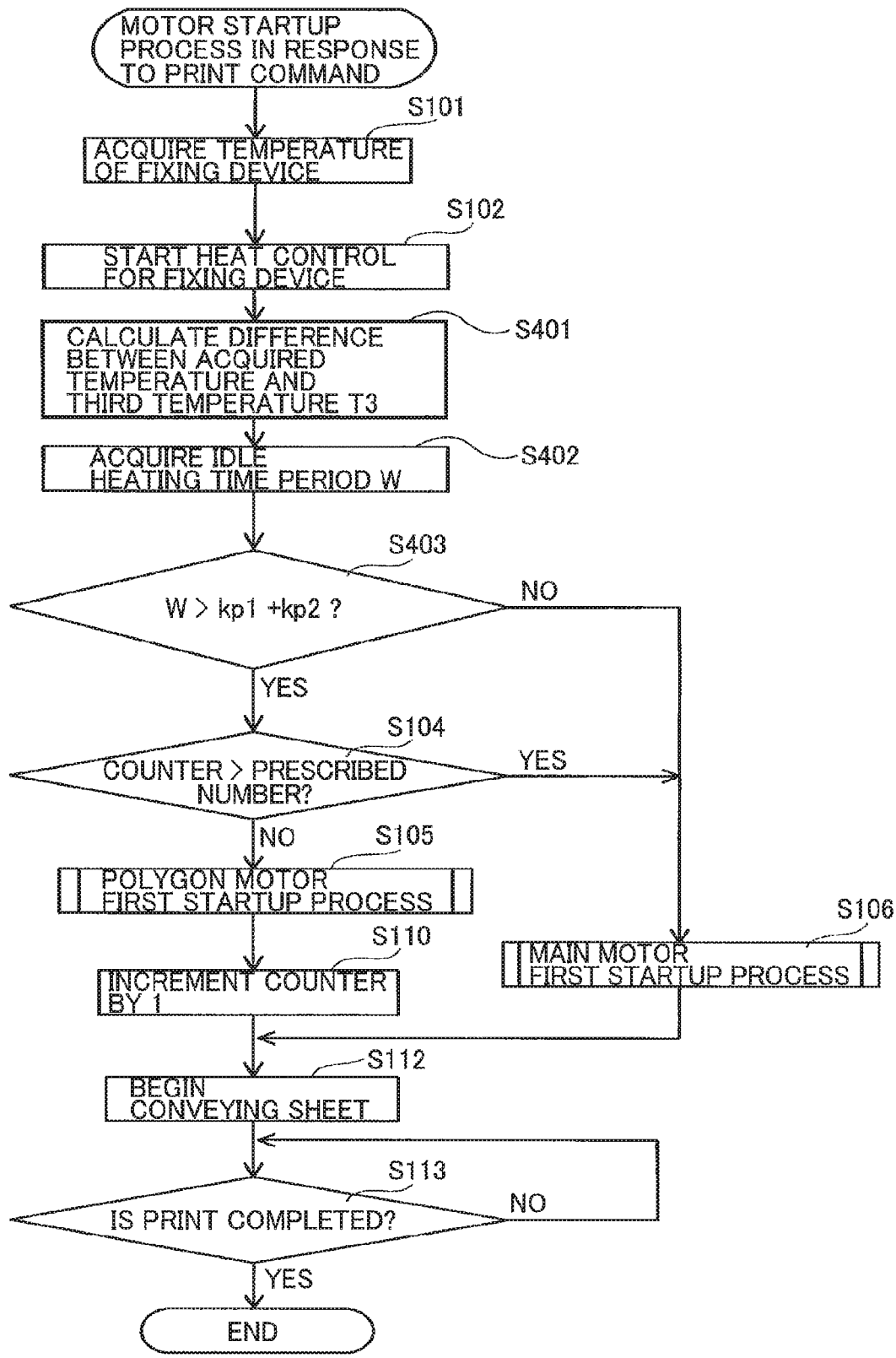
FIG. 10 is a flowchart illustrating a motor startup process according to a second embodiment.

First, steps in the motor startup process executed by the printer 100 according to the second embodiment will be described with reference to the flowchart in FIG. 10. The CPU 31 executes the motor startup process in response to receiving a print command while in a sleep state, i.e., while electricity is not being conducted to the motors 62 and 72. The motor startup process according to the second embodiment is an example of the configuration process.

In S101 of the motor startup process, the CPU 31 acquires the temperature of the fixing device 8. In S102 the CPU 31 starts heat control for the heater 811 of the fixing device 8. In S401 the CPU 31 calculates the difference between the temperature acquired in S101 and the third temperature T3. As described in the first embodiment, the third temperature T3 is the temperature of the fixing device 8 at which the main motor 72 is started in order that the fixing device 8 reaches the conveyance starting temperature Ts at the timing when preparation of the main motor 72 is complete. Thus, the timing at which the temperature of the fixing device 8 reaches the third temperature T3 is the latest (or, lattermost) timing at which the main motor 72 can be started without lengthening the FPOT and is the startup timing Sm of the main motor 72 when the polygon motor 62 is started prior to the main motor 72, as in the example of FIG. 5.

In S402 the CPU 31 acquires an idle heating time period. The idle heating time period is the time period required to raise the temperature of the fixing device 8 by the temperature difference acquired in S401 when the fixing device 8 is heated at the rate of temperature rise α, i.e., the time period required to reach the startup timing Sm of the main motor 72 after energizing of the heater 811 begins. As indicated in FIG. 5, an idle heating time period W is the estimated time period required for the temperature of the fixing device 8 to rise from the control starting temperature T0 to the third temperature T3 at the rate of temperature rise α. In other words, the idle heating time period W includes: an estimated preparation time period for the polygon motor 62 from a rotation start timing of the polygon motor 62 to a timing at which rotation of the polygon motor 62 reaches the first target rotational speed; and an estimated time period to stabilize rotation of the polygon motor 62 after the rotational speed of the polygon motor 62 reaches the first target rotational speed. The idle heating time period W is estimated as a time period from a timing when the temperature is at T0 to a timing when a temperature is at T3. The idle heating time period is an example of a first time period. The timing when the temperature is at T3 is an estimated timing when the main motor 72 starts rotation. The idle heating time period W is expressed by the following Equation 9.

$$W=(T3-T0)/\alpha \qquad \text{Equation 9}$$

In S403 the CPU 31 determines whether the idle heating time period W acquired in S402 is longer than the preparation time period for the polygon motor 62 (kp1+kp2). The preparation time period (kp1+kp2) indicates a sum of the time period (kp1) from a startup timing denoting the timing at which the polygon motor 62 is started until a startup completion timing denoting the timing at which the rotational speed of the polygon motor 62 reaches the first target rotational speed and a time period (kp2) estimated for stabilizing the rotation of the polygon motor 62 after startup of the polygon motor 62 is complete. The preparation time period is an example of the second time period. As described above, the preparation time period for the polygon motor 62 is the sum of the startup time period kp1 for the polygon motor 62 and the prescribed time period kp2 required for the rotation of the polygon motor 62 to stabilize. The preparation time period for the polygon motor 62 is an example of the first motor preparation time period.

When the CPU 31 determines that W>(kp1+kp2) (S403: YES), in S104 the CPU 31 determines whether the counter exceeds the prescribed number. When the CPU 31 determines that the counter does not exceed the prescribed number (S104: NO), in S105 the CPU 31 executes the polygon motor first startup process. This process is identical to the polygon motor first startup process in FIG. 8 described in the first embodiment. Note that the CPU 31 may also reach a YES determination in S403 when W=(kp1+kp2). In other words, when W>(kp1+kp2) (S403: YES), the CPU 31 sets a first-motor-start timing prior to a second-moto-start timing. Here, the first-motor-start timing is a timing at which the polygon motor 62 starts rotation, and the second-moto-start timing is a timing at which the main motor 72 starts rotation.

After completing the polygon motor first startup process, in S110 the CPU 31 increments the counter by 1, and in S112 begins sheet conveyance and printing. In S113 the CPU 31 determines whether the printing operation for the received print command was completed. When the printing operation was not completed (S113: NO), the CPU 31 continues the printing operation. When the printing operation was completed (S113: YES), the CPU 31 ends the motor startup process.

On the other hand, when the CPU 31 determines that W≤(kp1+kp2) (S403: NO) or when the CPU 31 determines that the counter exceeds the prescribed number (S104: YES), in S106 the CPU 31 executes the main motor first startup process. The main motor first startup process is identical to the process described in FIG. 9 of the first embodiment. In other words, when W≤(kp1+kp2) (S403: NO), the CPU 31 sets the second-motor-start timing prior to the first-moto-start timing.

After completing the main motor first startup process, in S112 the CPU 31 begins sheet conveyance and printing. In S113 the CPU 31 determines whether the printing operation for the received print command was completed. When the printing operation was not completed (S113: NO), the CPU 31 continues the printing operation. When the printing operation was completed (S113: YES), the CPU 31 ends the motor startup process.

As described above, the printer 100 according to the second embodiment sets the latest (or lattermost) timing for starting the main motor 72 (a timing when the temperature of the fixing device 8 reaches the third temperature T3) and acquires the idle heating time period W indicating the time period required to reach the startup timing Sm of the main motor 72 after heating of the heater 811 begins. Next, the printer 100 sets the motor startup order based on whether the idle heating time period W is longer than the preparation time period for the polygon motor 62. This method can also shorten the time required for the printer 100 to reach a print-ready state, thereby shortening the FPOT.

While the disclosure has been described in detail with reference to specific embodiments thereof, it would be apparent to those skilled in the art that many modifications and variations may be made therein without departing from the scope of the disclosure, the scope of which is defined by the attached claims. For example, in addition to a printer, the present disclosure may be applied to a photocopier, a multifunction peripheral, a facsimile machine, or another apparatus having an electrophotographic image-forming function. Further, while the printer described in the embodiments is capable of forming color images, the present disclosure may also be applied to an apparatus that forms only monochrome images. Further, the present disclosure may be applied to an intermediate transfer-type printer.

While temperatures such as the threshold temperature T1 are stored in a memory such as the ROM 32 and the NVRAM 34 in the embodiments described above, variables may be used instead. For example, the conveyance starting temperature Ts may be set on the basis of the type of sheet or the like specified in the print command, and each temperature may be calculated on the basis of the conveyance starting temperature Ts. Further, the motor startup order may be determined from the calculated temperatures.

In the embodiments described above, when the polygon motor 62 is started prior to the main motor 72, the main motor 72 is started a prescribed time after completion of startup of the polygon motor 62, but it is not necessary to wait this prescribed time. Further, when the main motor 72 is started prior to the polygon motor 62, the polygon motor 62 may be started a prescribed time after startup of the main motor 72 is complete.

Further, when the number of times the polygon motor 62 has been started up prior to the main motor 72 exceeds a prescribed count, the main motor 72 is started first thereafter, but the startup order need not be limited according to this count. In other words, steps S104 and S110 may be omitted from the motor startup process in FIG. 7 or FIG. 10.

Further, the lengths of the motor startup time periods, prescribed times, and the like are not limited to the relationships given in the embodiments. For example, the elevating time period km2 required for elevating the pressing plate 911 may be shorter than or longer than the sum of the startup time period km1, startup time period kp1, and prescribed time period kp2.

Further, the polygon motor 62 may be started prior to the main motor 72 regardless of the temperature of the fixing device 8 at the start of control when the pressing plate 911 is already elevated at the start of control, i.e., when the elevating time period km2 is 0. In other words, the printer 100 may start the polygon motor 62 after starting the main motor 72 when it is necessary to execute the elevating operation for the pressing plate 911 at the start of control, and may start the main motor 72 after starting the polygon motor 62 when the elevating operation is not necessary. When the elevating operation for the pressing plate 911 is required, it is ensured to start sheet conveyance before the temperature of the fixing device 8 reaches the target temperature by starting the main motor 72 first, making it possible to shorten the FPOT. However, when the elevating operation for the pressing plate 911 is unnecessary, sheet conveyance may be started at the timing when the main motor 72 is started. Accordingly, it is possible to reduce the FPOT by allocating a longer idle heating time period and shortening the time period required for the temperature of the fixing device 8 to reach the target temperature.

In the embodiments described above, conveying members such as the pressing-plate unit are driven by the main motor 72, but the conveying members may be driven by a separate motor, for example, provided that the conveying members can convey a sheet to the fixing device 8 in synchronization with driving the main motor.

The processes described in the embodiments may be executed by a single CPU, a plurality of CPUs, hardware such as an ASIC, or a combination of these components. Further, the processes described in the embodiments may be implemented according to various methods and using any of various storage media for storing programs used to execute the processes.

What is claimed is:

1. An image forming apparatus comprising:
   a polygon mirror configured to reflect light emitted from a light source;
   a first motor configured to rotary drive the polygon mirror;
   a photosensitive member having an outer peripheral surface which receives the light reflected by the polygon mirror;
   a fixing device having a heater, a first member, and a second member, wherein the first member and the second member are configured to convey a sheet interposed therebetween, the fixing device being located downstream of the photosensitive member in a conveying direction of the sheet;
   a second motor configured to rotary drive the first member;
   a conveyance device having a roller configured to convey the sheet;
   a sensor configured to output a signal depending on temperature of the fixing device; and
   a controller operatively connected to the first motor, the second motor, the heater, and the conveyance device, the controller being configured to:
   start the heater to heat up in response to a print command;
   in a first case where the signal indicates that the temperature of the fixing device at a timing of reception of the print command is lower than a first threshold value, start rotating the first motor before the temperature of the fixing device reaches a target temperature, and subsequently start rotating the second motor before the conveying device conveys the sheet according to the received print command wherein the first threshold value is lower than the target temperature; and
   in a second case where the signal indicates that the temperature of the fixing device at the timing of reception of the print command is higher the first threshold value, start rotating the second motor before the temperature of the fixing device reaches the target temperature, and subsequently start rotating the first motor before the conveying device conveys the sheet according to the received print command.

2. The image forming apparatus according to claim 1, wherein the first motor has a fist rated current and the second motor has a second rated current larger than the first rated current.

3. The image forming apparatus according to claim 1, wherein in the first case the controller is configured to start rotating the second motor after a rotational speed of the first motor reaches a first target rotational speed.

4. The image forming apparatus according to claim 3, wherein the controller is configured to start rotating the second motor after a prescribed time period elapses from a timing when the rotation of the first motor reaches the first target rotational speed.

5. The image forming apparatus according to claim 1, in the second case the controller is configured to start rotating the first motor after a rotational speed of the second motor reaches a second target rotational speed.

6. The image forming apparatus according to claim 1, wherein the controller is further configured to:
   count number of times that the first motor starts prior to the second motor; and start the second motor prior to the first motor regardless of the temperature based on the signal when the number of times exceeds a prescribed number.

7. The image forming apparatus according to claim 1, wherein in the first case the controller is configured to start rotating the first motor when a condition that a current temperature of the fixing device is higher than a second threshold value is met, wherein the second threshold value is lower than the first threshold value.

8. The image forming apparatus according to claim 1, wherein the controller is further configured to:
set a start temperature to a third threshold value in the first case; and
set the start temperature to a fourth threshold value lower than the third threshold value in the second case,
wherein the controller controls the second motor to start rotation when a condition that the threshold of the fixing device reaches the start temperature is met.

9. The image forming apparatus according to claim 1, further comprising a tray configured to accommodate the sheet,
wherein in the second case the controller is further configured to control the conveyance device to start conveying the sheet from the tray when both a first condition and a second condition are met, the first condition being that a current temperature of the fixing device reaches a lower limit temperature, the second condition being that a prescribed time elapses after a rotational speed of the first motor reaches a first target rotational speed,
wherein the lower limit temperature is set so that the signal indicates the temperature of the fixing device reaches the target temperature until the sheet reaches the fixing device if the conveyance device starts conveying the sheet from the tray at a timing when the current temperature reaches the lower limit temperature.

10. The image forming apparatus according to claim 1, further comprising a tray configured to accommodate the sheet,
wherein the conveyance device includes:
a pressing plate configured to be in contact with the sheet, and move between a first position and a second position by driven force from the second motor; and
a feed roller configured to contact the sheet and convey the sheet toward the fixing device by driven force from the second motor when the pressing plate is at the second position.

11. An image forming apparatus comprising:
a polygon mirror configured to reflect light emitted from a light source;
a first motor configured to rotary drive the polygon mirror;
a photosensitive member having an outer peripheral surface which receives the light reflected by the polygon mirror;
a fixing device having a heater, a first member, and a second member, wherein the first member and the second member are configured to convey a sheet interposed therebetween, the fixing device being located downstream of the photosensitive member in a conveying direction of the sheet;
a second motor configured to rotary drive the first member;
a sensor configured to output a signal depending on temperature of the fixing device; and
a controller operatively connected to the first motor, the second motor, and the heater, the controller being configured to:
start the heater to heat up in response to a print command;
estimate a first time period starting at a timing when the heater starts heating up and ending at an estimated timing when the second motor starts rotation;
in a first case where the first time period is longer than a second time period, set a first-motor-start timing prior to a second-motor-start timing, wherein the first-motor-start timing is a timing at which the first motor starts rotation and the second-motor-start timing is a timing at which the second motor starts rotation, the second time period including an estimated preparation time period for the first motor from a rotation start timing of the first motor to a timing at which rotation of the first motor reaches a first target rotational speed, and
in a second case where the first time period is shorter than the second time period, set the second-motor-start timing prior to the first-motor-start timing.

12. The image forming apparatus according to claim 11, wherein in the first case, the controller is configured to set the second-motor-start timing after the rotational speed of the first motor reaches the first target rotational speed and before conveyance of the sheet starts according to the print command.

13. The image forming apparatus according to claim 11, wherein in the second case, the controller is configured to set the first-motor-start timing after rotational speed of the second motor reaches a second target rotational speed and before the conveyance of the sheet starts according to the print command.

14. The image forming apparatus according to claim 11, wherein the controller is further configured to:
count number of times that the first motor is started prior to the second motor; and
set the second-motor-start timing prior to the first-motor-start timing rotating regardless of whether the first time period is longer than the second time period.

15. The image forming apparatus according to claim 11, wherein the controller is further configured to acquire: a driving time period during which the heater heats up; and
a stop time period during which the heater stops heating up, as values correlated to the temperature of the fixing device.

16. The image forming apparatus according to claim 11, wherein the first time period further includes an estimated time period to stabilize rotation of the first motor after the rotational speed of the first motor reaches the first target rotational speed.

17. The image forming apparatus according to claim 11, further comprising a tray configured to accommodate the sheet,
wherein the temperature of the fixing device rises at a first speed when the heater heats up in a case where the second motor stops whereas the temperature of the fixing device rises a second speed smaller than the first speed in a case where the heater heats up while the second motor rotates,
wherein the controller is further configured to estimate the estimated timing so that the temperature of the fixing device reaches a prescribed temperature at the estimated timing if the temperature of the fixing device rises at the first speed after the heater starts heating up,
wherein the prescribed temperature is set so that the temperature of the fixing device reaches a lower limit temperature subsequent to a timing when rotational speed of the second motor reaches a second target rotational speed if the temperature of the fixing device starts rising at the second speed from a timing when the temperature of the fixing device is at the prescribed temperature, wherein the lower limit temperature is set so that the signal indicates the temperature of the fixing device reaches a target temperature until the sheet reaches the fixing device if the conveyance device starts conveying the sheet from the tray at a timing when the temperature of the fixing device reaches the lower limit temperature.

18. A non-transitory computer readable storage medium storing a set of program instructions installed on and executed by a computer for controlling an image forming apparatus including: a polygon mirror configured to reflect light emitted from a light source; a first motor configured to rotary drive the polygon mirror; a photosensitive member having an outer peripheral surface which receives the light reflected by the polygon mirror; a fixing device having a heater, a first member, and a second member, wherein the first member and the second member are configured to convey a sheet interposed therebetween, the fixing device being located downstream of the photosensitive member in a conveying direction of the sheet; a second motor configured to rotary drive the first member; a conveyance device having a roller configured to convey the sheet; a sensor configured to output a signal depending on temperature of the fixing device; and a controller operatively connected to the first motor, the second motor, the heater, and the conveyance device, the set of program instructions comprising:

starting the heater to heat up in response to a print command;

in a first case where the signal indicates that the temperature of the fixing device at a timing of reception of the print command is lower than a first threshold value, starting rotating the first motor before the temperature of the fixing device reaches a target temperature, and subsequently starting rotating the second motor before the conveying device conveys the sheet according to the received print command wherein the first threshold value is lower than the target temperature; and in a second case where the signal indicates that the temperature of the fixing device at the timing of reception of the print command is higher the first threshold value, starting rotating the second motor before the temperature of the fixing device reaches the target temperature, and subsequently starting rotating the first motor before the conveying device conveys the sheet according to the received print command.

19. A non-transitory computer readable storage medium storing a set of program instructions installed on and executed by a computer for controlling an image forming apparatus including: a polygon mirror configured to reflect light emitted from a light source; a first motor configured to rotary drive the polygon mirror; a photosensitive member having an outer peripheral surface which receives the light reflected by the polygon mirror; a fixing device having a heater, a first member, and a second member, wherein the first member and the second member are configured to convey a sheet interposed therebetween, the fixing device being located downstream of the photosensitive member in a conveying direction of the sheet; a second motor configured to rotary drive the first member; a sensor configured to output a signal depending on temperature of the fixing device; and a controller operatively connected to the first motor, the second motor, and the heater, the set of program instructions comprising:

starting the heater to heat up in response to a print command;

estimating a first time period starting at a timing when the heater starts heating up and ending at an estimated timing when the second motor starts rotation;

in a first case where the first time period is longer than a second time period, setting a first-motor-start timing prior to a second-motor-start timing, wherein the first-motor-start timing is a timing at which the first motor starts rotation and the second-motor-start timing is a timing at which the second motor starts rotation, the second time period including an estimated preparation time period for the first motor from a rotation start timing of the first motor to a timing at which rotation of the first motor reaches a first target rotational speed, and in a second case where the first time period is shorter than the second time period, setting the second-motor-start timing prior to the first-motor-start timing.

* * * * *